US008680954B2

(12) United States Patent
Wakabayashi et al.

(10) Patent No.: US 8,680,954 B2
(45) Date of Patent: Mar. 25, 2014

(54) WAVEGUIDE, WAVEGUIDE CONNECTION STRUCTURE AND WAVEGUIDE CONNECTION METHOD

(75) Inventors: Yoshiaki Wakabayashi, Tokyo (JP); Risato Ohhira, Tokyo (JP); Hiroshi Toyao, Tokyo (JP)

(73) Assignee: NEC Corporation, Tokyo (JP)

( * ) Notice: Subject to any disclaimer, the term of this patent is extended or adjusted under 35 U.S.C. 154(b) by 377 days.

(21) Appl. No.: 13/060,570

(22) PCT Filed: Aug. 5, 2009

(86) PCT No.: PCT/JP2009/003759
§ 371 (c)(1),
(2), (4) Date: Feb. 24, 2011

(87) PCT Pub. No.: WO2010/023827
PCT Pub. Date: Mar. 4, 2010

(65) Prior Publication Data

US 2011/0156844 A1 Jun. 30, 2011

(30) Foreign Application Priority Data

Aug. 29, 2008 (JP) ................................ 2008-221873

(51) Int. Cl.
*H01P 1/04* (2006.01)
*B23P 11/00* (2006.01)

(52) U.S. Cl.
USPC ............................................ 333/254; 29/428

(58) Field of Classification Search
USPC ............... 333/35, 248, 251, 260, 254; 29/428
See application file for complete search history.

(56) References Cited

U.S. PATENT DOCUMENTS 2,826,524 A * 3/1958 Molloy ........................ 156/151

FOREIGN PATENT DOCUMENTS

| | | | |
|---|---|---|---|
| JP | 51-93642 | A | 7/1976 |
| JP | 10-224101 | A | 8/1996 |
| JP | 9-148808 | A | 6/1997 |
| JP | 2003078310 | A | 3/2003 |
| JP | 2003188601 | A | 7/2003 |
| JP | 2006041966 | A | 2/2006 |
| JP | 2008113318 | A | 5/2008 |

OTHER PUBLICATIONS

International Search Report for PCT Application No. PCT/JP2009/003759 mailed on Nov. 10, 2009.

* cited by examiner

*Primary Examiner* — Benny Lee
*Assistant Examiner* — Rakesh Patel
(74) *Attorney, Agent, or Firm* — Sughrue Mion, PLLC

(57) ABSTRACT

A waveguide includes: a first tubular waveguide path that transmits electromagnetic waves having a predetermined wavelength; and a stub that is formed such that a depth thereof becomes a quarter of the predetermined wavelength, an open end of the stub making internal contact with a contour line, and the contour line being spaced apart from an inner wall part of one end of the first tubular waveguide path in a radially outward direction by only a quarter of the predetermined wavelength.

7 Claims, 18 Drawing Sheets

WAVEGUIDE, WAVEGUIDE CONNECTION STRUCTURE AND WAVEGUIDE CONNECTION METHOD

This application is the National Phase of PCT/JP2009/003759, filed Aug. 5, 2009, which claims priority to and the benefits of Japanese Patent Application No. 2008-221873 filed on Aug. 29, 2008, the disclosure of which is incorporated herein by reference.

TECHNICAL FIELD

The present invention relates to a waveguide, a waveguide connection structure, and a waveguide connection method.

BACKGROUND ART

With the recent development of information and communication technology, the application to millimeter wave band devices for consumer use is expected. The millimeter wave band is used for, for instance, high-speed transmission of digital signals or automobile radars. For the personal devices, smallness, thinness, and low cost are required. As such, for present digital signal transmission or automobile radars, transmission lines or antennas are formed on resin substrates. Thereby, the requirements for the smallness, thinness, and low cost are intended to be met.

As an example of this device, a high-frequency module is disclosed in Patent Document 1. The high-frequency module includes a high-frequency line 102 formed on a surface of a dielectric substrate 101, a frame-like connection electrode 104 formed on a lower surface of the dielectric substrate 101 just below one end of the high-frequency line 102, an interconnection substrate 100B having a waveguide part 107 in which a conductor layer 106 is formed on an inner surface of a through-hole 105 and an upper end of the conductor layer 106 is electrically connected to the connection electrode 104 throughout a circumference thereof, and a conversion part 103 converting a transmission mode of transmitting the high-frequency line 102 into a waveguide mode of transmitting the waveguide part 107 (see FIG. 18).

The high-frequency module disclosed in Patent Document 1 converts the transmission mode of the signal transmitted to the high-frequency line 102 inside a high-frequency substrate 100A into the waveguide mode, and transmits the signal to the interconnection substrate 100B connected to the high-frequency substrate 100A via the waveguide part 107.

However, the technology disclosed in Patent Document 1 has several problems. Among such problems, one is due to the use of solder, or the like to ensure reliable connection to the waveguide part. The use of solder, or the like is for preventing a phenomenon in which, when a gap is generated to make an incomplete electrical connection at the connection part of a waveguide, the signal leaks out from the waveguide to increase an insertion loss. However, when an amount of the solder on a connection surface is less than a required amount, the electrical connection is made incomplete. Further, when the amount of the solder on a connection surface is more than a required amount, the solder leaks to an undesired part outside the connection part, and thus the waveguide has a shape different from its design at the connection part. In either case, the insertion loss is increased.

Thus, due to the use of solder, or the like, there is another problem in that material or assembly costs are increased.

Patent Document 1: Japanese Unexamined Patent Application, First Publication No. 2006-041966 (FIG. 1)

DISCLOSURE OF INVENTION

Problem to be Solved by the Invention

The present invention has been made in view of the above-described circumstances, and an object of the invention is to provide a waveguide, a waveguide connection structure, and a waveguide connection method, which are capable of making a waveguide connection without using solder when the waveguide is connected with a resin substrate, and suppressing an increase in insertion loss even when the connection is incomplete.

Means for Solving the Problem (1) According to an aspect of the present invention, there is provided a waveguide including: a first tubular waveguide path that transmits electromagnetic waves having a predetermined wavelength; and a stub that is formed such that a depth thereof becomes a quarter of the predetermined wavelength, an open end of the stub making internal contact with a contour line, and the contour line being spaced apart from an inner wall part of one end of the first tubular waveguide path in a radially outward direction by only a quarter of the predetermined wavelength.

(2) According to another aspect of the present invention, there is provided a waveguide connection structure including: a waveguide having a first tubular waveguide path that transmits electromagnetic waves having a predetermined wavelength, and a stub that is formed such that a depth thereof becomes a quarter of the predetermined wavelength, an open end of the stub making internal contact with a contour line, and the contour line being spaced apart from an inner wall part of one end of the first tubular waveguide path in a radially outward direction by only a quarter of the predetermined wavelength; and a connection counterpart having a second waveguide path that forms a surface having the same shape and size as a radial cross section of the first waveguide path and transmits the predetermined wavelength of electromagnetic waves, and an electrically conductive frame part that can make external contact with an outer circumference of the open end of the stub on an outer side of the second waveguide path and is electrically connected to the second waveguide path.

(3) In the waveguide connection structure according to the aspect of the present invention, the waveguide and the frame part may be connected to define a second stub, and the second stub and the stub may be integrated to form a choke trench having a length half of the predetermined wavelength.

(4) In the waveguide connection structure according to the aspect of the present invention, the frame part may form a closed annular shape made of metal.

(5) In the waveguide connection structure according to the aspect of the present invention, the frame part may be made up of a plurality of metal bumps disposed so as to be electrically continuous.

(6) In the waveguide connection structure according to the aspect of the present invention, the frame part may include: vias that make external contact with a position spaced apart from a wall of the second waveguide path in an outward direction by only a quarter of the predetermined wavelength, that are disposed so as to be electrically continuous, and that extend into the connection counterpart; and at least one of inner layer patterns and a planar inner layer pattern that is connected to the vias so as to be electrically equivalent to a metal plane from the wall of the second waveguide path to the vias.

(7) In the waveguide connection structure according to the aspect of the present invention, the waveguide may include a fitting trench fitted to the frame part.

(8) In the waveguide connection structure according to the aspect of the present invention, the connection counterpart may include a resin substrate having a resin layer and a metal layer.

(9) According to still another aspect of the present invention, there is provided a waveguide connection method including: forming a stub which makes internal contact with a contour line spaced apart from an inner wall part of one end of a waveguide, which has a first waveguide path transmitting electromagnetic waves having a predetermined wavelength, in a radially outward direction by only a quarter of the predetermined wavelength and a depth of which becomes a quarter of the predetermined wavelength; in a connection counterpart having a second waveguide path transmitting the predetermined wavelength of electromagnetic waves, forming an electrically conductive frame part which is electrically connected to the first waveguide path so as to make external contact with a position spaced apart from a wall of the second waveguide path in an outward direction by only a quarter of the predetermined wavelength; and fixing the waveguide and the connection counterpart under pressure after an open end of the stub is fitted to a position making internal contact with the frame part, and connecting the waveguide and the second waveguide path.

Effect of the Invention

According to a waveguide and a waveguide connection structure of the present invention, it is possible to make a waveguide path connection without using solder when the waveguide is connected to a resin substrate, and to suppress an increase in insertion loss even when the connection is incomplete.

BEST MODE FOR CARRYING OUT THE INVENTION

First Embodiment

Figure 1:
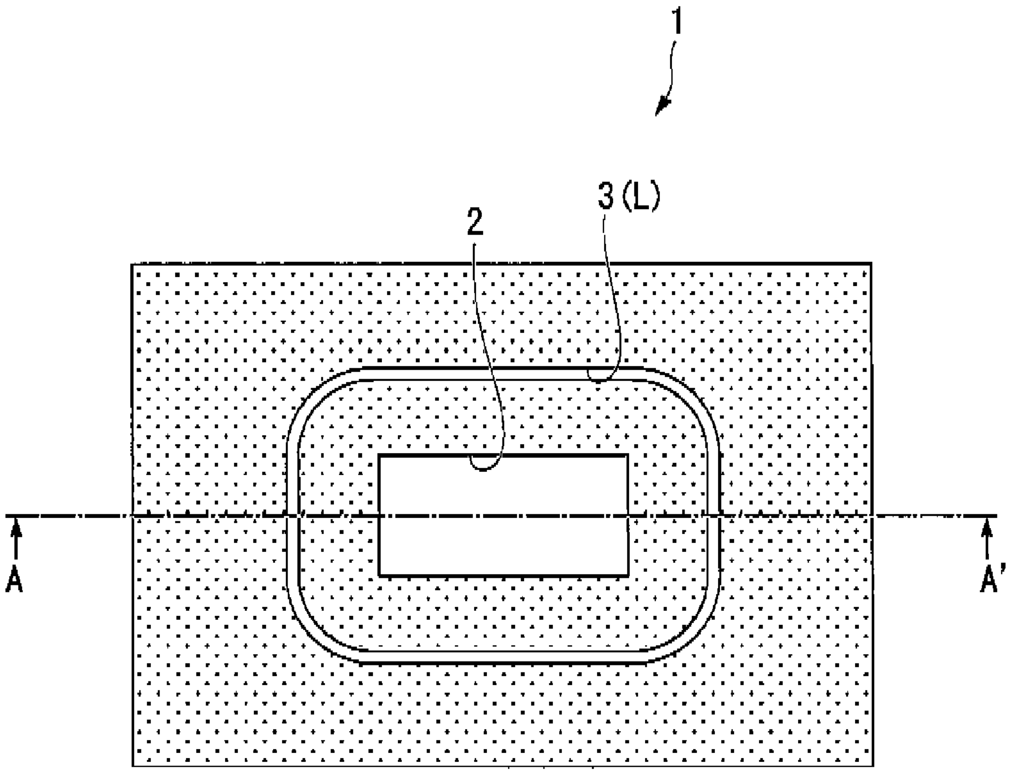
FIG. 1 is a plan view showing a waveguide according to a first embodiment of the present invention.
Figure 2:
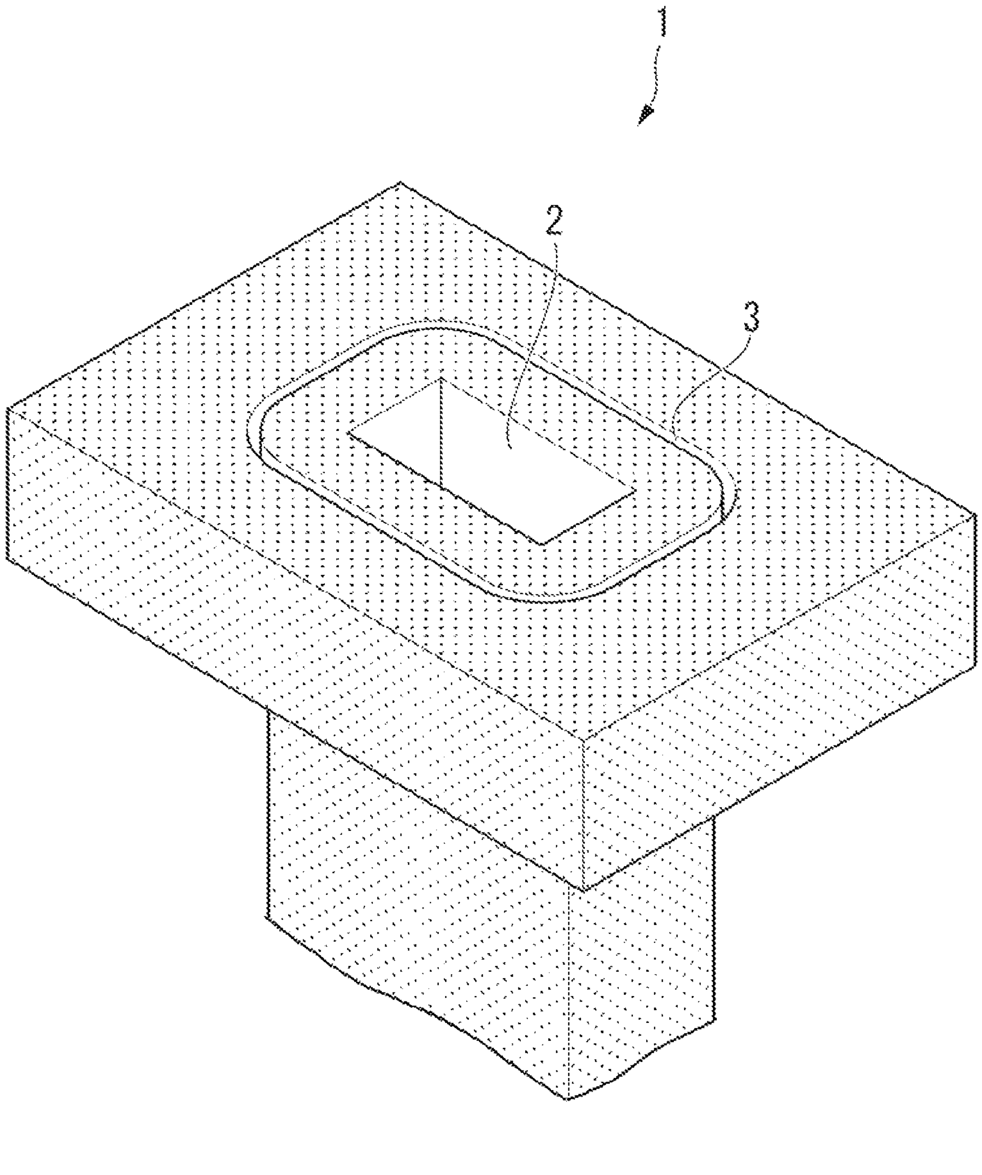
FIG. 2 is a perspective view showing the waveguide according to the first embodiment of the present invention.
Figure 3:
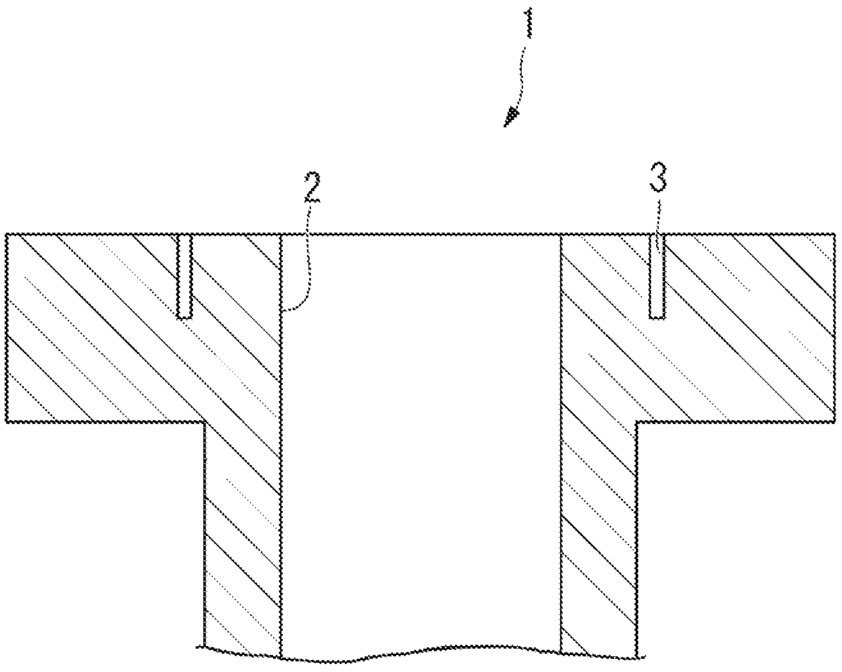
FIG. 3 is a cross-sectional view showing the waveguide according to the first embodiment of the present invention.
Figure 4:
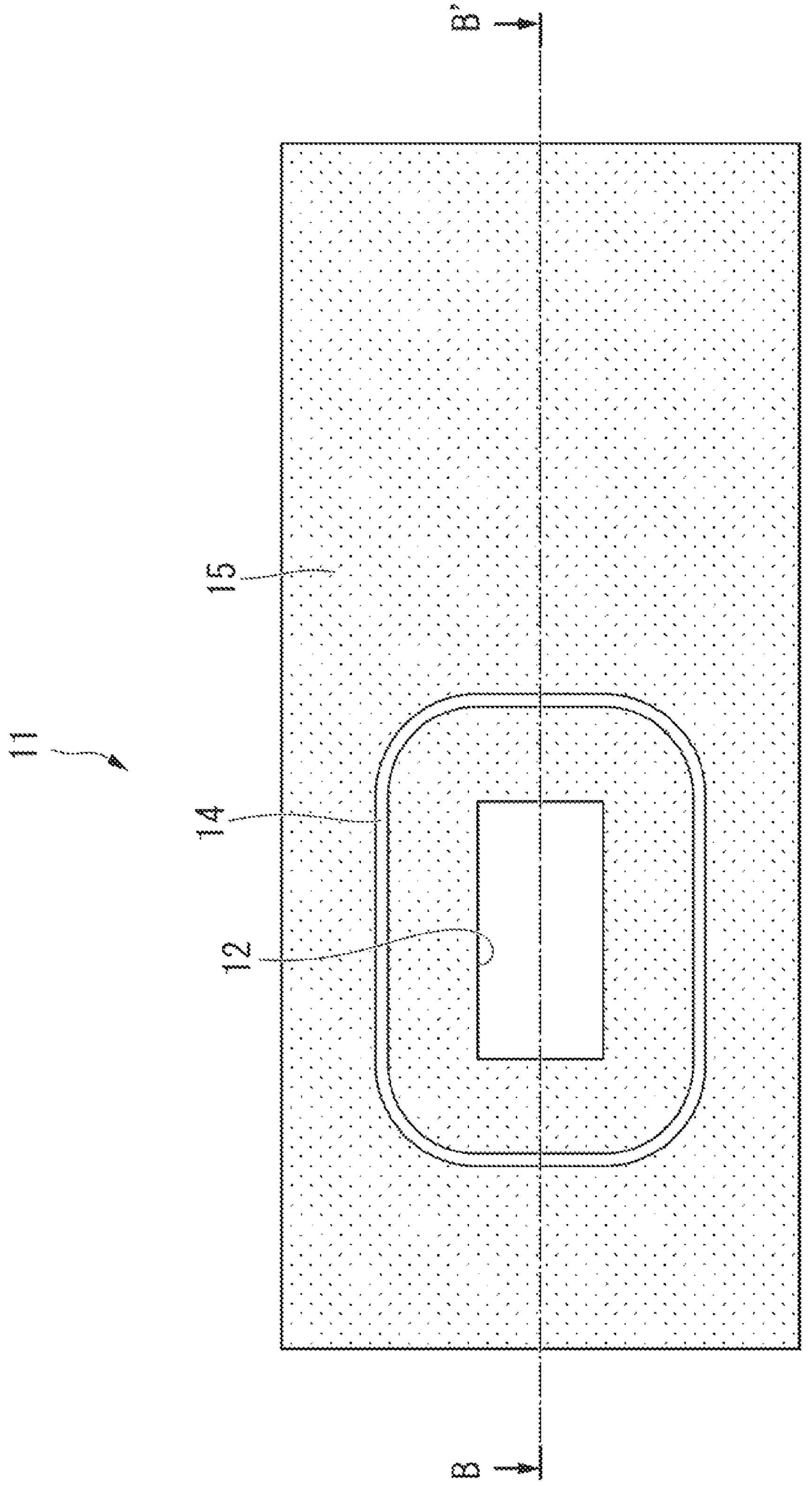
FIG. 4 is a plan view showing a resin substrate according to the first embodiment of the present invention.
Figure 5:
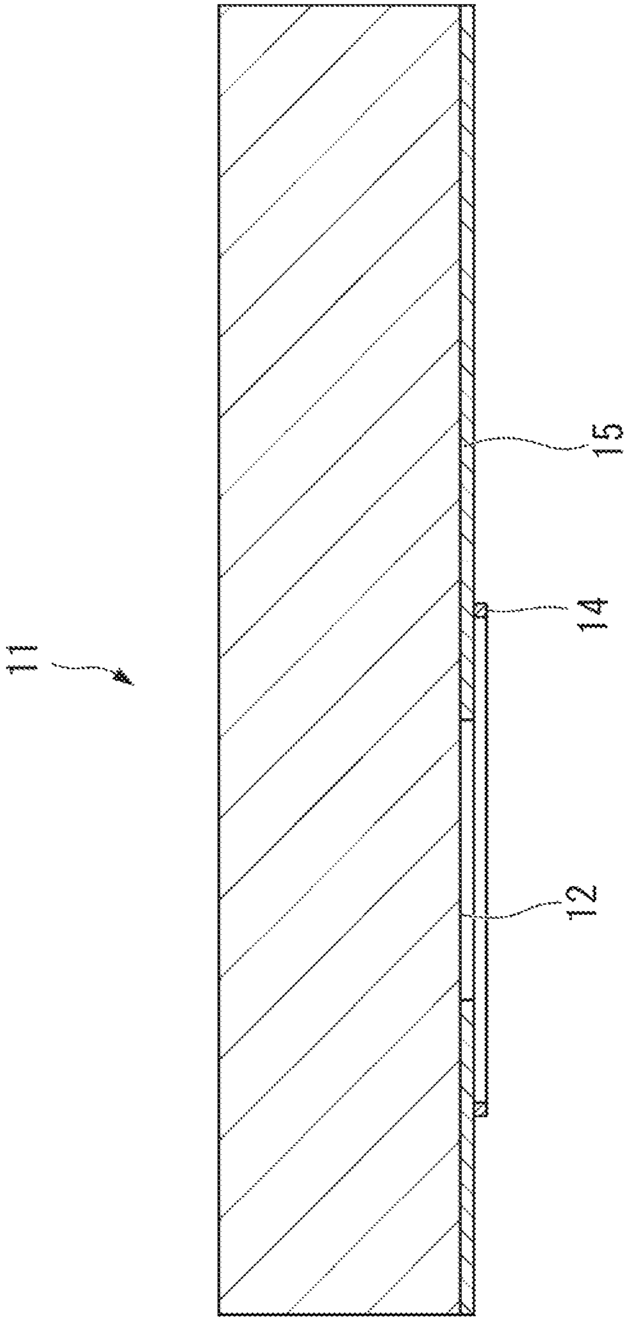
FIG. 5 is a cross-sectional view showing the resin substrate according to the first embodiment of the present invention.
Figure 6:
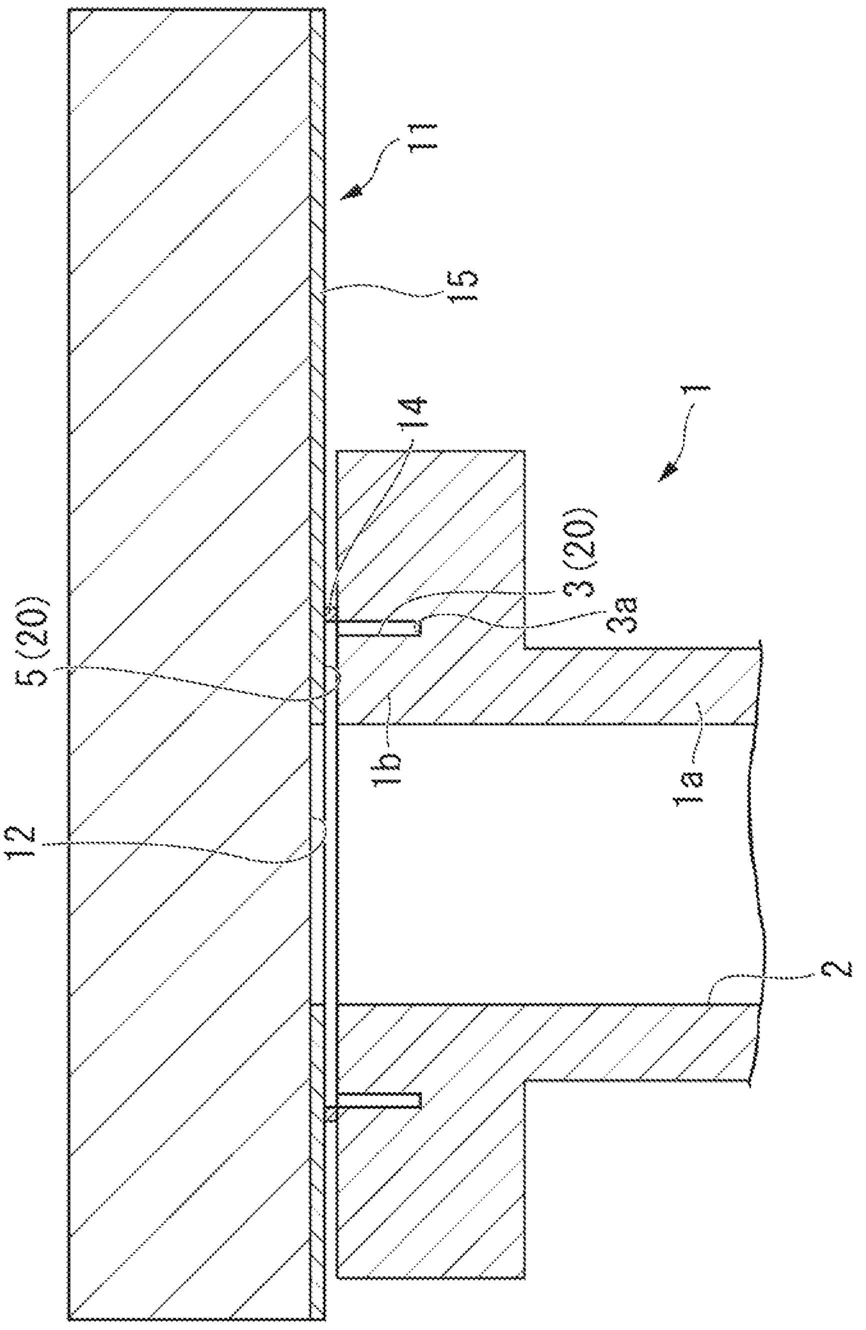
FIG. 6 is a cross-sectional view showing the state where the waveguide and the resin substrate are interconnected according to the first embodiment of the present invention.

A waveguide and a waveguide connection structure according to a first embodiment of the present invention will now be described with reference to FIGS. 1 through 6. FIG. 1 is a plan view of a waveguide case 1. FIG. 2 is a perspective view of the waveguide case 1. FIG. 3 is a cross-sectional view taken along line A-A' of the waveguide case 1 of FIG. 1. FIG. 4 is a plan view showing a resin substrate (i.e. a connection counterpart) 11 to which the waveguide case 1 is connected. FIG. 5 is a cross-sectional view taken along line B-B' of the resin substrate 11 shown in FIG. 4. FIG. 6 is a cross-sectional view showing the connection state of the waveguide case 1 and the resin substrate 11.

As shown in FIG. 1, the waveguide case 1 is a case that realizes a waveguide transmission line. The waveguide case 1 of the present embodiment is made by cutting copper, and plating gold on the cut copper. The waveguide case 1 is provided therein with a first waveguide path 2. In the present embodiment, the first waveguide path 2 has a rectangular shape.

As shown in FIGS. 1 through 3, the waveguide case 1 includes a stub 3, which is formed by grooving the waveguide case 1 at a position spaced apart from a wall of the first waveguide path 2 by only a quarter of a wavelength $\lambda$ of electromagnetic waves R transmitted into the first waveguide path 2. The stub 3 has a grooved depth corresponding to the quarter of the wavelength $\lambda$. The stub 3 has a grooved position where an outer circumference thereof is located at a distance of the quarter of the wavelength $\lambda$ from the wall of the first waveguide path 2. Further, the stub 3 makes internal contact with a contour line L that is spaced apart from an inner wall part of the first waveguide path 2 in a radially outward direction by only a quarter of the wavelength $\lambda$. Further, in the present embodiment, both the wall and bottom of the stub 3 are plated with gold. An internal space of the stub 3 is hollow, and is filled with air. In addition, as shown in FIG. 3, in the present embodiment, the stub 3 is grooved in an axial direction of the first waveguide path 2.

FIG. 4 is a plan view of the resin substrate 11 to which the waveguide case 1 is connected. FIG. 5 is a cross-sectional view of the resin substrate 11 to which the waveguide case 1 is connected. The resin substrate 11 is provided with a second waveguide path 12 of a waveguide structure in which no internal structure is shown.

The resin substrate 11 is connected to the waveguide case 1. As such, the second waveguide path 12 formed in the resin substrate 11 preferably has the same dimensions as the first waveguide path 2 of the waveguide case 1.

As shown in FIG. 5, a connection surface of the resin substrate 11 connected to the waveguide case 1 is provided with a metal wall 14 serving as a frame part at a position spaced apart from the second waveguide path 12 by the quarter of the wavelength λ. The metal wall 14 is electrically connected to the second waveguide path 12. In FIGS. 4 and 5, the metal wall 14 and the second waveguide path 12 are electrically connected to each other via a copper film 15 on a surface of the resin substrate 11. However, in FIG. 4, the connection between the second waveguide path 12 and the copper film 15 is not shown.

The metal wall 14 is preferably formed by copper plating. Further, the metal wall 14 is disposed such that an inner wall thereof is located at the position spaced apart from the second waveguide path 12 by the quarter of the wavelength λ. When the metal wall 14 is formed by thick plating, there is a problem in that a formation cost is increased. As such, the thickness of the metal wall 14 is preferably set to about 50 microns.

FIG. 6 is a cross-sectional view of the state where the waveguide case 1 and the resin substrate 11 are connected to each other. When the waveguide case 1 and the resin substrate 11 are connected to each other, the waveguide case 1 is in contact with the metal wall 14 because the metal wall 14 is formed on the connection surface of the resin substrate 11. Thereby, a space from the walls of the first and second waveguide paths 2 and 12 to the metal wall 14 serves as a second stub 5 of the quarter of the wavelength λ, wherein the second stub 5 uses the waveguide case 1, the copper film 15 of the connection surface of the resin substrate 11, and the metal wall 14 as a ground surface.

The waveguide case 1 and the resin substrate 11 are screwed by a screwing mechanism (not shown). The metal wall 14 of the resin substrate 11 is fixed under pressure to a position which makes external contact with the stub 3 of the waveguide case 1.

The inner wall of the metal wall 14 and the outer circumference of the stub 3 are located at the position that is the quarter of the wavelength λ from the first and second waveguide paths 2 and 12. As such, as shown in FIG. 6, the second stub 5 of the quarter of the wavelength λ is connected to the stub 3 of the quarter of the wavelength λ. Thus, a choke trench 20 having a length half of the wavelength λ from the walls of the first and second waveguide paths 2 and 12 is generated.

The operation of the waveguide and the waveguide connection structure of the present embodiment which has the configuration described above will be described with reference to FIGS. 6 through 11.

As shown in FIG. 6, electromagnetic waves R (not shown) having a wavelength λ enter the first waveguide path 2 from the side of a leading end 1*a* of the waveguide case 1. Thereby, the electromagnetic waves R are transmitted to the side of a base end 1*b* of the first waveguide path 2 while being reflected on a gold-plated inner surface of the first waveguide path 2.

The electromagnetic waves R reach the base end 1*b* of the first waveguide path 2. Some of the electromagnetic waves R travel into the choke trench 20. Thereby, the waves incident on the choke trench 20 are incident on the stub 3 via the second stub 5, and are reflected on a bottom 3*a* of the stub 3. Then, the electromagnetic waves R travel from the stub 3 to reach a joint of the first waveguide path 2 and the second waveguide path 12 via the second stub 5.

A leading end of the choke trench 20 of the half of the wavelength λ which is formed by the second stub 5 and the stub 3 is a leading end of the trench of the stub 3. Since the stub 3 is formed in the waveguide case 1 of metal by grooving, the leading end thereof is electrically short-circuited. When the choke trench 20 of the half of the wavelength λ is short-circuited at one end thereof, the other end thereof is short-circuited. Accordingly, when the waveguide case 1 and the resin substrate 11 are connected to each other, the first waveguide path 2 in the waveguide case 1 and the second waveguide path 12 in the resin substrate 11 are equivalent to what is connected in the ideal state where an electrical short-circuit is realized. Thereby, the electromagnetic waves R are transmitted from the first waveguide path 2 to the second waveguide path 12 via the choke trench 20.

Further, when the waveguide case 1 and the resin substrate 11 are connected to each other, the electrical connection of the waveguide case 1 and the metal wall 14 on the resin substrate 11 may be made incomplete due to a screwing failure of connection screws (not shown) and the bending of the resin substrate 11.

In the present embodiment, the metal wall 14 serves as a connection part of the waveguide case 1 and the resin substrate 11. Further, the metal wall 14 is disposed at the position of the quarter of the wavelength λ from the first waveguide path 2 or the second waveguide path 12. In addition, the metal wall 14 is located at a place of the quarter of the wavelength λ from the short-circuited end of the stub 3.

When the stub 3 is short-circuited at one end thereof, the other end thereof is opened, and the bottom of the stub 3 serves as a short-circuited end. As such, a connection part of the waveguide case 1 and the metal wall 14 which is an open end of the stub 3 is electrically opened regardless of complete or incomplete connection of the waveguide case 1 and the metal wall 14.

As described above, the second stub 5 made up of the waveguide case 1, the resin substrate 11, and the metal wall 14 has a length a quarter of the wavelength λ. When the second stub 5 of the quarter of the wavelength λ is opened at one end thereof, the other end thereof is short-circuited. The connection part of the waveguide case 1 and the metal wall 14 is electrically opened regardless of whether the connection thereof is complete or incomplete. As a result, the other end of the second stub 5, i.e. a wall part of the first and second waveguide paths 2 and 12, is electrically short-circuited. In other words, in the present embodiment, even when the connection of the waveguide case 1 and the resin substrate 11 is incomplete, the first waveguide path 2 in the waveguide case 1 and the second waveguide path 12 in the resin substrate 11 are equivalent to what is connected in the ideal state where an electrical short-circuit is realized.

Next, the present invention will be described in greater detail in connection with an embodiment. The present invention is, however, not limited to this embodiment.

Figure 7:
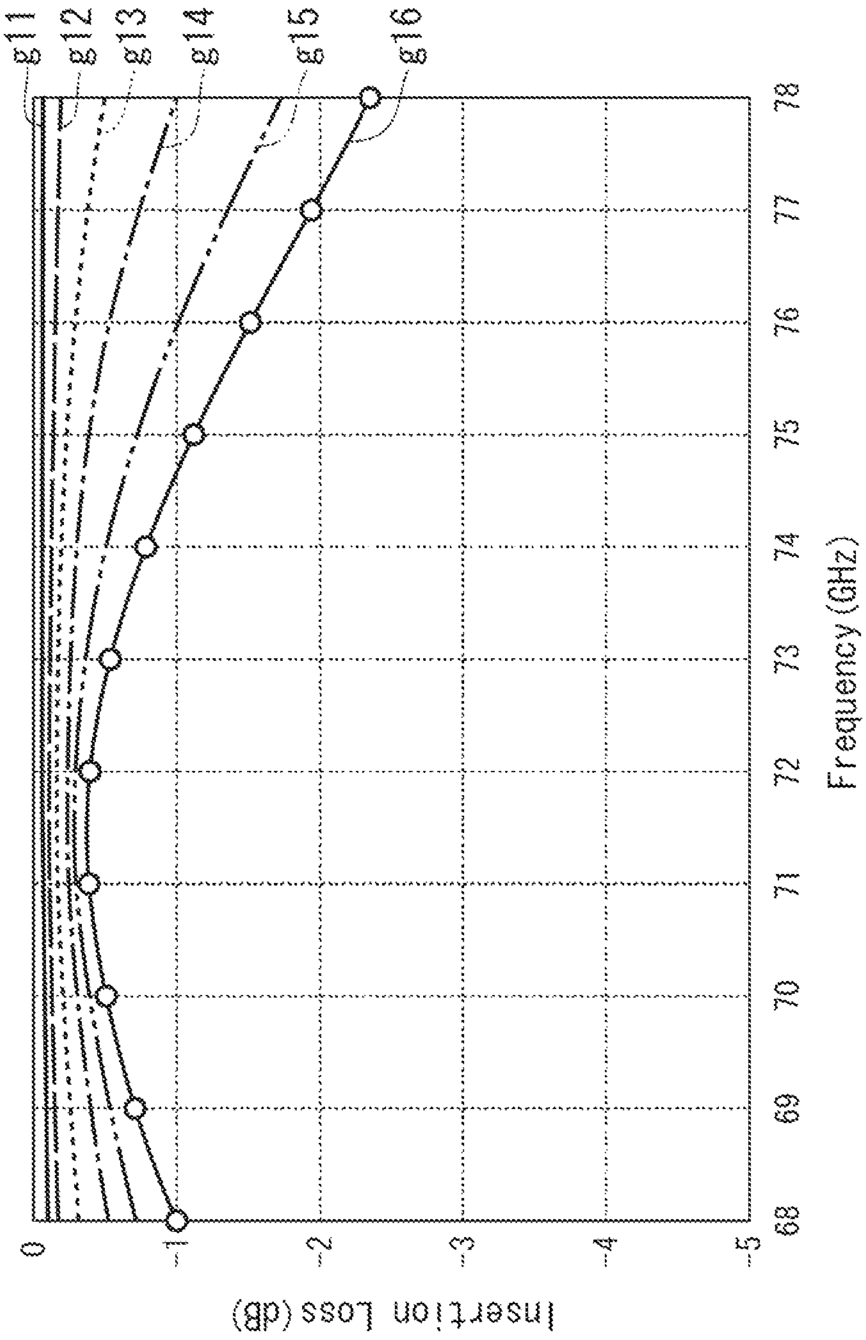
FIG. 7 is a graph of insertion loss showing effects of the first embodiment of the present invention.

FIG. 7 shows the results of a three-dimensional electromagnetic field analysis of insertion loss from the waveguide case 1 to the resin substrate 11 when the connection of the waveguide case 1 and the resin substrate 11 as shown in FIG. 6 is complete and when the connection is incomplete.

In the present embodiment, the waveguide case 1 and the resin substrate 11 are designed to use 72 GHz as a central frequency. Further, in the present embodiment, an analysis is made using a frequency of the electromagnetic waves R as 72 GHz. In the graph, the horizontal axis indicates the frequency, and the longitudinal axis indicates the insertion loss. A graph g11 shows an analysis result when a distance between the waveguide case 1 and the resin substrate 11 is zero (0), i.e. when the waveguide case 1 and the resin substrate 11 are interconnected as in FIG. 6.

Graphs g12, g13, g14, g15 and g16 show analysis results when the waveguide case 1 and the resin substrate 11 are not interconnected and the distances therebetween are 100 microns, 200 microns, 300 microns, 400 microns, and 500 microns, respectively.

Figure 8:
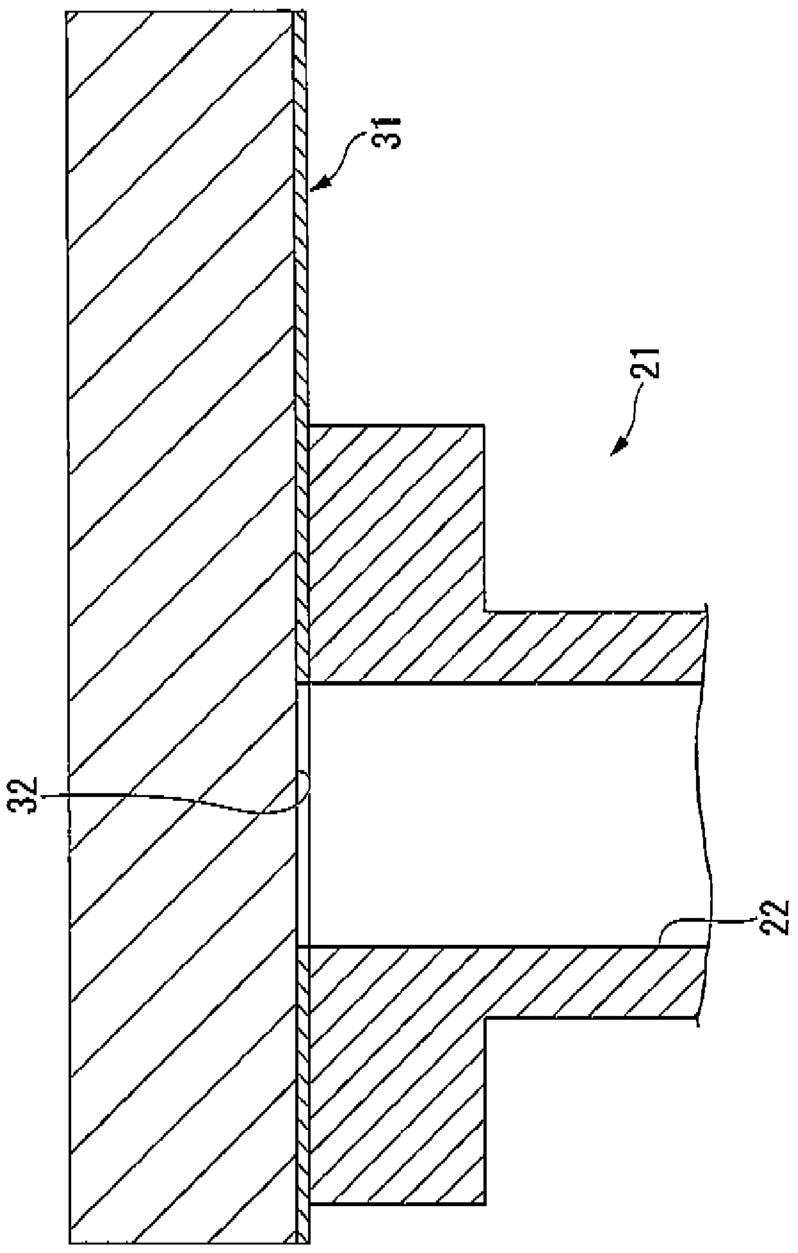
FIG. 8 Prior Art
FIG. 8 is a cross-sectional view showing the state where a waveguide and a resin substrate are interconnected in the related art.
Figure 9:
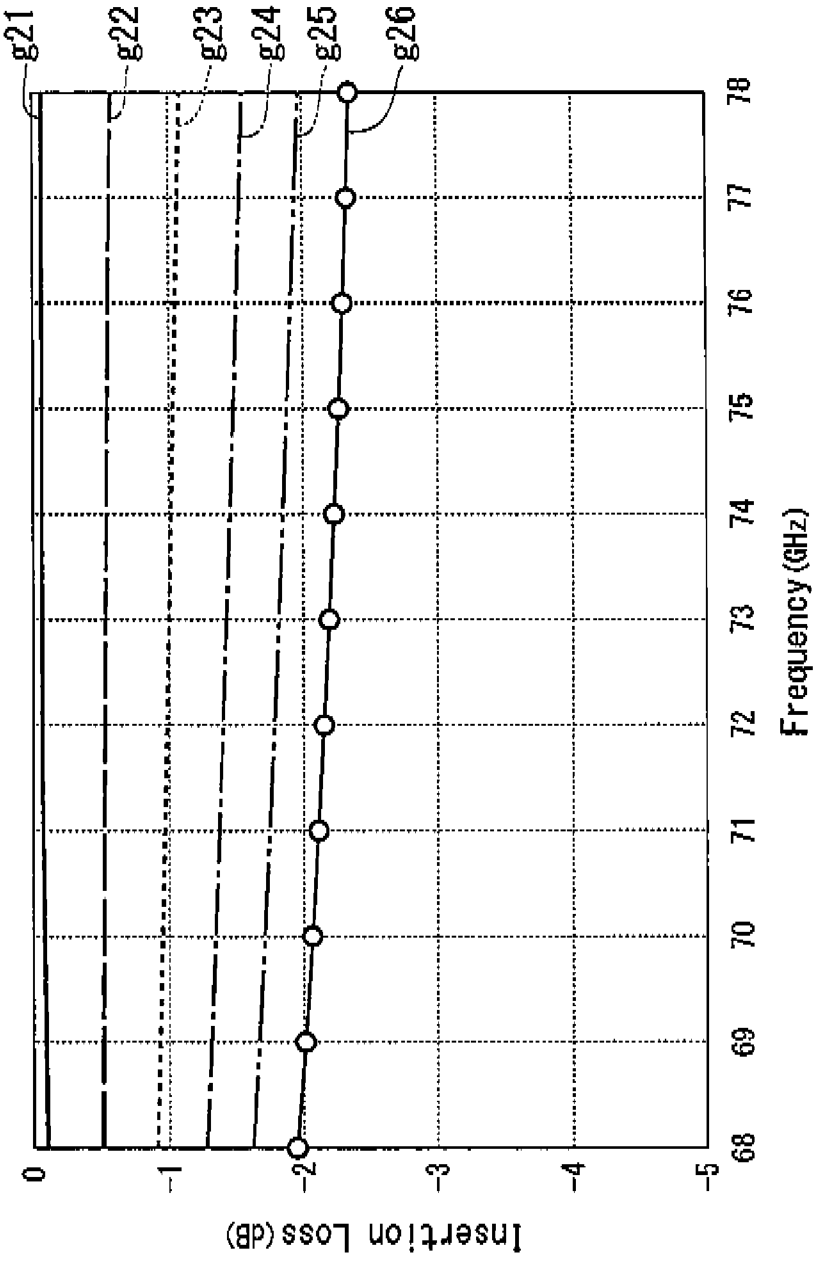
FIG. 9 Prior Art
FIG. 9 is a graph of insertion loss in the related art.

FIG. 9 shows characteristics when a conventional waveguide case 21 without a stub and a resin substrate 31 without a metal wall are interconnected as shown in FIG. 8. In the graph, the horizontal axis indicates the frequency, and the longitudinal axis indicates the insertion loss. Graphs g21, g22, g23, g24, g25 and g26 show analysis results of the insertion loss of electromagnetic waves R from a first waveguide path 22 to a second waveguide path 32 when the waveguide case and the resin substrate are interconnected completely and incompletely and the distances therebetween are 0 microns, 100 microns, 200 microns, 300 microns, 400 microns, and 500 microns, respectively.

As shown in FIG. 9, in a conventional stub-free waveguide connection structure shown in FIG. 8, as a gap between a waveguide case 1 and a resin substrate 31 widens, the insertion loss increases. This shows that the electromagnetic waves R leak out from the gap between the waveguide case 21 and the resin substrate 31.

On the other hand, in the present embodiment shown in FIG. 7, as the gap between the waveguide case 1 and the resin substrate 11 widens, the insertion loss increases. However, the increment of the insertion loss is clearly small compared to that of FIG. 9. Particularly, the insertion loss caused by the gap between the waveguide case 1 and the resin substrate 11 is remarkably suppressed around the central frequency of 72 GHz.

In other words, it is possible to reduce an amount of the electromagnetic waves R leaking out from the gap between the waveguide case 1 and the resin substrate 11 by means of the waveguide connection structure of the present embodiment.

The operation of the waveguide connection structure of the present embodiment when the resin substrate 11 is subjected to minute bending will be described below in detail.

Figure 11:
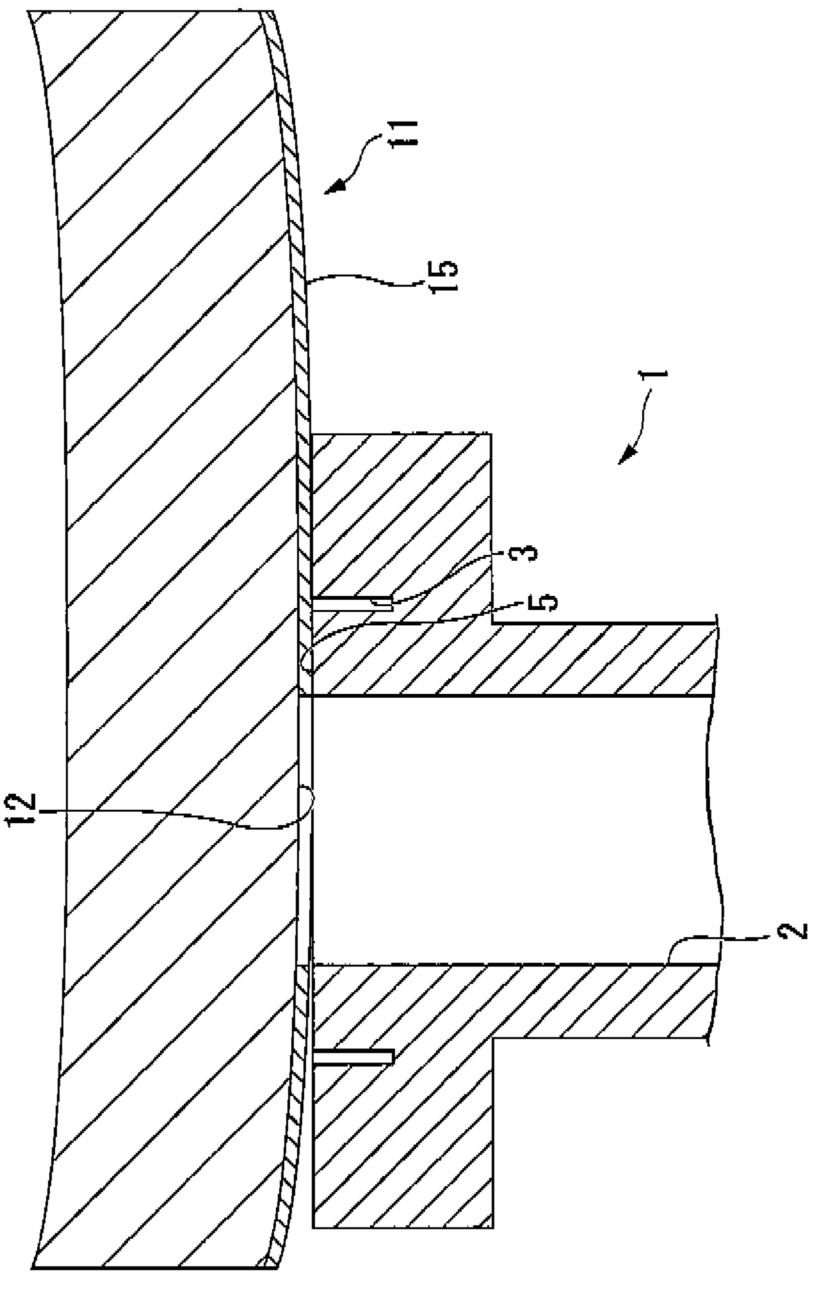
FIG. 11 Prior Art
FIG. 11 is a cross-sectional view showing the case where the resin substrate is subjected to bending in the related art.

In the conventional waveguide connection structure shown in FIG. 8, when a minute bending of 50 microns or less is generated from the resin substrate 31, the connection between the waveguide case 21 and the resin substrate 31 is incomplete as in FIG. 11, and thus the gap therebetween becomes wider. As a result, the insertion loss between the waveguide case 21 and the resin substrate 31 increases.

Figure 10:
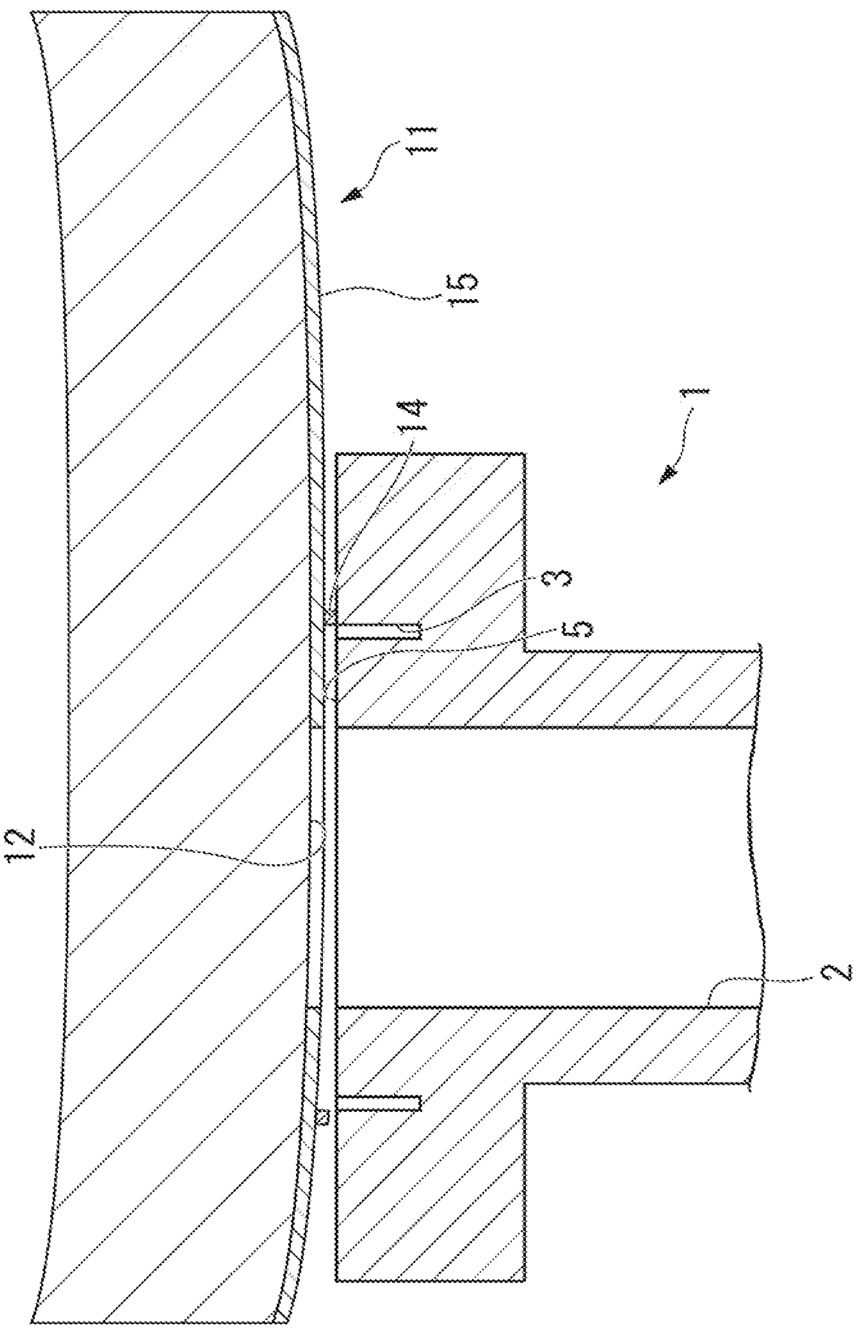
FIG. 10 is a cross-sectional view showing the case where the resin substrate is subjected to bending according to the first embodiment of the present invention.

On the other hand, in the waveguide connection structure of the present embodiment as shown in FIG. 10, the metal wall 14 having a thickness of about 50 microns is formed on the resin substrate 11. As such, when the amount of bending of the resin substrate 11 is less than 50 microns, the connection of the metal wall 14 on the resin substrate 11 and the waveguide case 1 is kept complete. Thus, even when the metal wall 14 is spaced apart from the waveguide case 1 as described above, it is possible to suppress an increase in the insertion loss around the central frequency of the electromagnetic waves R. Accordingly, in the present embodiment, even when the resin substrate 11 is subjected to the minute bending, the transmission from the waveguide case 1 to the resin substrate 11 is possible without insertion loss.

As described above, according to the waveguide, the waveguide connection structure, and the waveguide connection method of the present embodiment, the waveguide case 1 and the resin substrate 11 are interconnected via the metal wall 14. Further, the choke trench 20 is defined by the stub 3, which is the gap of the metal wall 14, the waveguide case 1, and the resin substrate 11, and the second stub 5 formed in the waveguide case 1. Accordingly, when the waveguide case 1 having the first waveguide path 2 is joined with the resin substrate 11 having the second waveguide path 12, it is possible to suppress an increase in the insertion loss of the electromagnetic waves R even when the junction of the waveguide case 1 and the resin substrate 11 becomes incomplete due to the screwing failure of the waveguide case 1 and the resin substrate 11 or the bending of the resin substrate 11.

Furthermore, in the present embodiment, the metal wall 14 can suppress an increase in the insertion loss even when the junction of the waveguide case 1 and the resin substrate 11 becomes incomplete. Accordingly, it is unnecessary to use the solder, or the like, which has been used in the related art, in order to realize reliable junction. As a result, it is possible to provide the waveguide and the waveguide connection structure capable of reducing material or assembly costs.

Further, in the present embodiment, when the waveguide case 1 and the resin substrate 11 are interconnected, the waveguide case 1 and the metal wall 14 of the resin substrate 11 are in contact with each other. Thereby, the space from the walls of the first and second waveguide paths 2 and 12 to the metal wall 14 serves as the second stub 5 of the quarter of the wavelength λ, wherein the second stub 5 uses the waveguide case 1, the resin substrate 11, and the metal wall 14 as the ground surface. Further, the stub 3 which makes internal contact with the metal wall 14 serves as a trench of the quarter of the wavelength λ. The second stub 5 of the quarter of the wavelength λ which uses the waveguide case 1, the resin substrate 11, and the metal wall 14 as the ground surface and the stub 3 which makes internal contact with the metal wall 14 are combined to form a stub of the half of the wavelength λ from the walls of the first and second waveguide paths 2 and 12.

A leading end of the stub of the half of the wavelength λ which is defined by the second stub 5 and the stub 3 serves as a leading end of the trench of the stub 3. Further, the stub 3 is formed in the waveguide case 1 of metal. As such, a leading end of the waveguide case 1 is electrically short-circuited. It is known that, when the stub of the half of the wavelength λ is short-circuited at one end thereof, the other end thereof is short-circuited. Accordingly, when the waveguide case 1 and the resin substrate 11 are interconnected, the first waveguide path 2 in the waveguide case 1 and the second waveguide path 12 in the resin substrate 11 are interconnected in the ideal state where an electrical short-circuit is realized.

Second Embodiment

Figure 12:
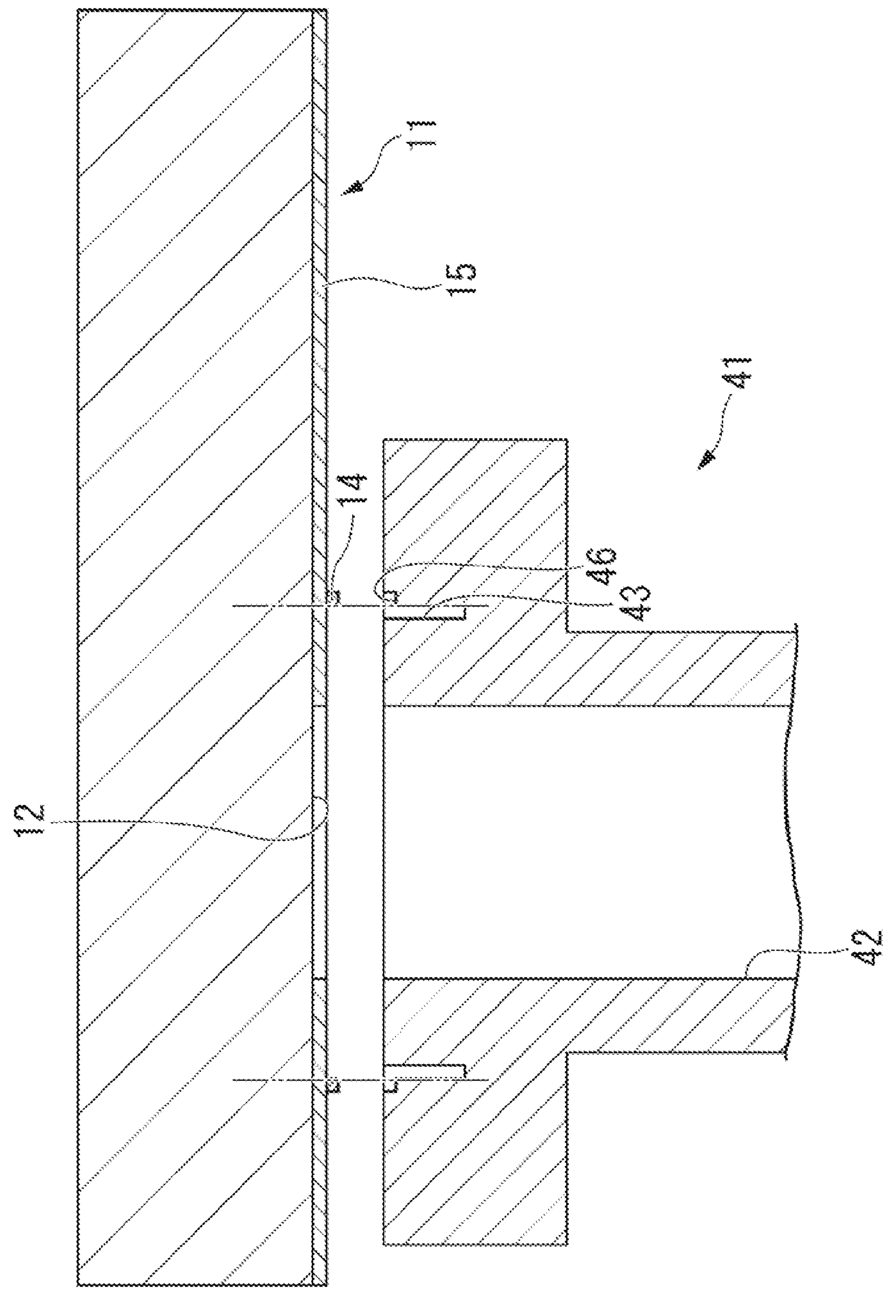
FIG. 12 is a cross-sectional view showing a second embodiment of the present invention.

Next, a waveguide, a waveguide connection structure, and a waveguide connection method according to a second embodiment of the present invention will be described with reference to FIG. 12. Further, in the embodiment described below, components having the same configuration as the aforementioned waveguide, waveguide connection structure, and waveguide connection method of the first embodiment will be designated by the same numerals, and so description thereof will be omitted.

The present embodiment is different in configuration from the first embodiment in that a waveguide case 41 in which a fitting trench 46 is formed replaces the waveguide case 1.

This fitting trench 46 preferably has a depth smaller than or equal to the thickness of a metal wall 14. This fitting trench 46 makes external contact with an open end of a stub 43, and is formed at a position which is in contact with the metal wall 14. Thereby, when connected to a resin substrate 11, the waveguide case 41 can be easily connected with high positional precision.

In addition, since the fitting trench 46 is present, a gap between the waveguide case 41 and the resin substrate 11 can be prevented from becoming empty even when the waveguide case 41 and the resin substrate 11 cannot be completely interconnected due to, for instance, bending. Thus, it is possible to prevent the electromagnetic waves R from leaking out from a connection part of a first waveguide path 42 and a second waveguide path 12.

Third Embodiment

Figure 13:
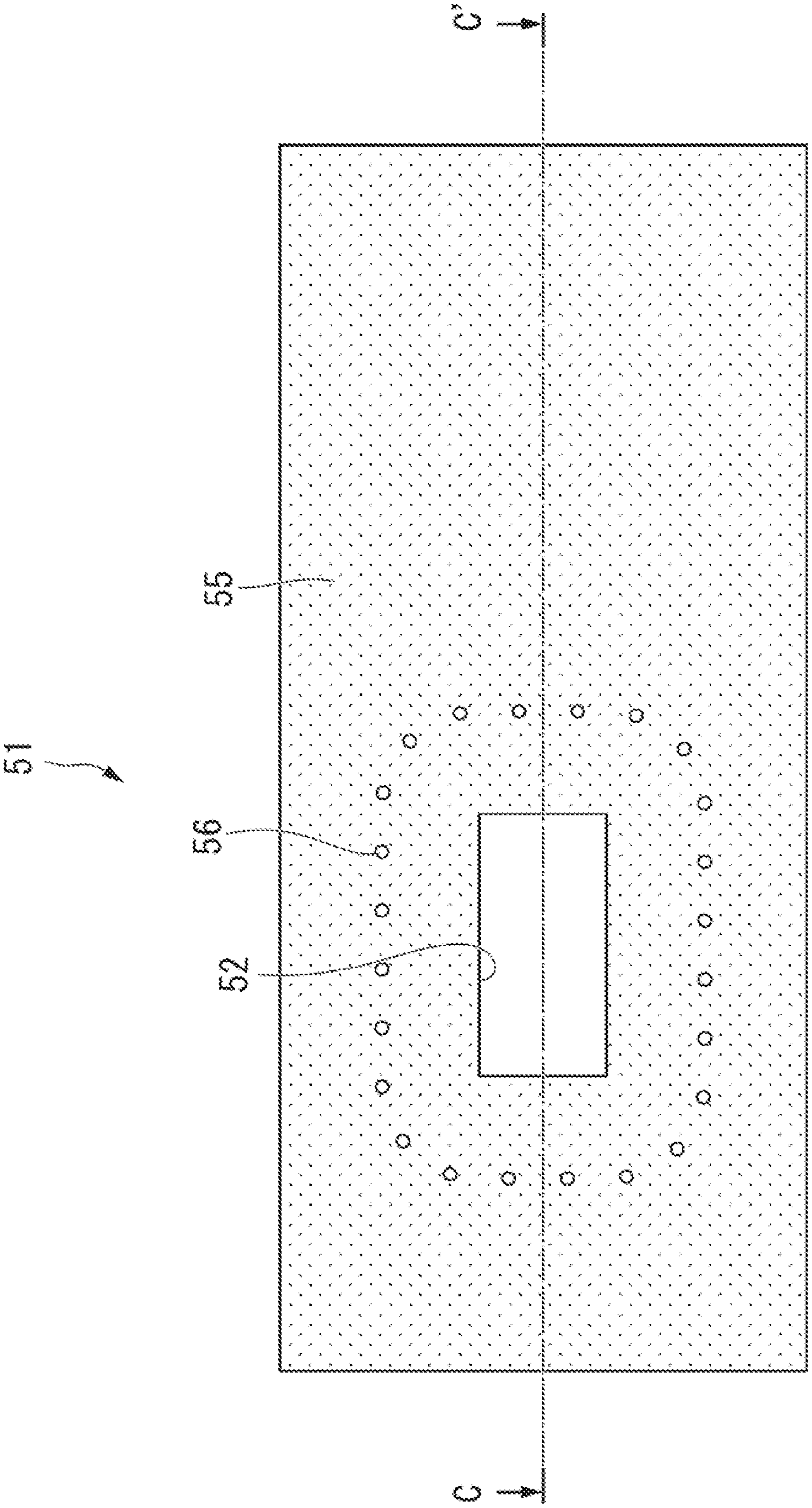
FIG. 13 is a plan view showing a resin substrate according to a third embodiment of the present invention.
Figure 14:
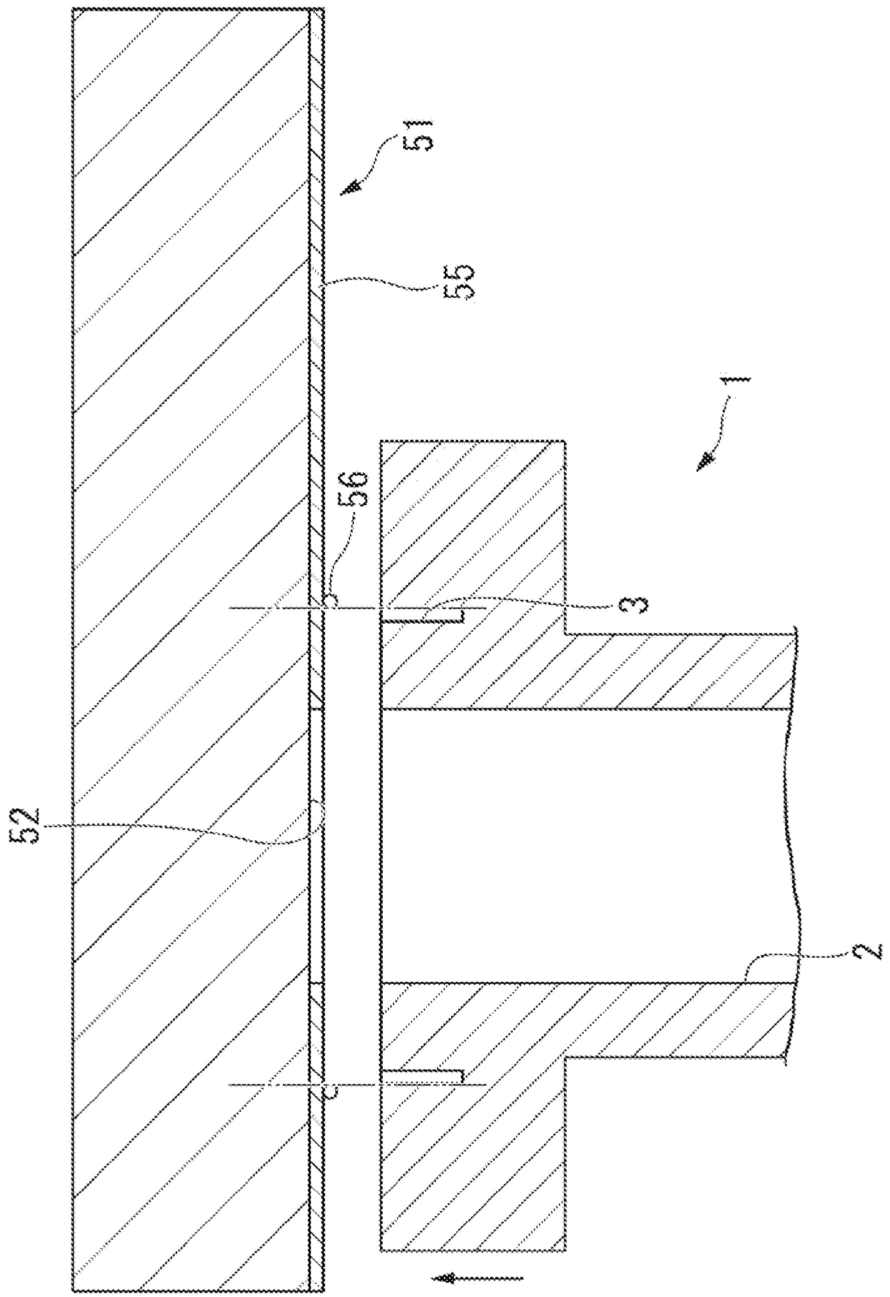
FIG. 14 is a cross-sectional view showing the third embodiment of the present invention.

Next, a waveguide, a waveguide connection structure, and a waveguide connection method according to a third embodiment of the present invention will now be described with reference to FIGS. 13 and 14.

The third embodiment is different in configuration from the first embodiment in that, in place of the metal wall 14 as the frame part, metal bumps 56 are formed on a resin substrate 51 at a position spaced apart from a second waveguide path 52 by only a quarter of the wavelength λ. Most preferably, the metal bumps 56 are protruding electrodes made of solder or gold. However, the protruding electrodes may be made of another conductor. The metal bumps 56 are electrically connected to a copper film 55. The copper film 55 is electrically connected to the second waveguide path 52. Most preferably, the metal bumps 56 are arranged in plural at intervals of a tenth of the wavelength λ. That is, the metal bumps 56 are disposed at such intervals that they are considered to be metals that are electrically continuous, rather than physically continuous. In this way, the metal bumps 56 can be regarded as being electrically continuous even when the physically discontinuous metal bumps 56 are employed as a frame part. Accordingly, the metal bumps 56 have the same effect as the metal wall 14 of the first embodiment.

The metal bumps 56 are widely used for flip-chip connection of a semiconductor chip. With the configuration of the present embodiment, a process of forming the frame part of the present embodiment can be shared with a process of forming the metal bumps for flip-chip connection, for instance, when one side of waveguide-waveguide path connection is the semiconductor chip. Accordingly, it is possible to reduce the number of processes and costs used to form the frame part.

Fourth Embodiment

Figure 15:
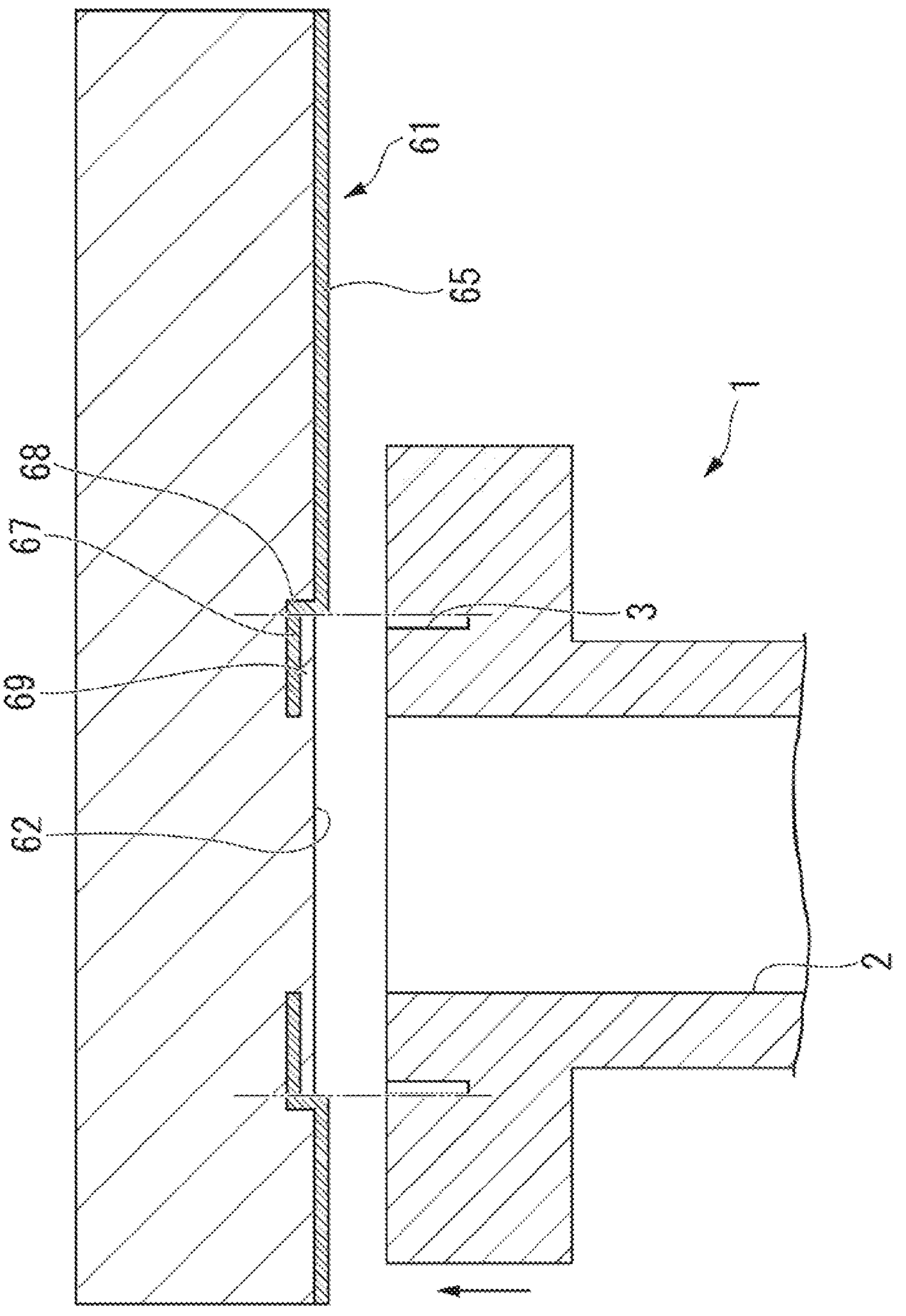
FIG. 15 is a cross-sectional view showing a fourth embodiment of the present invention.
Figure 16:
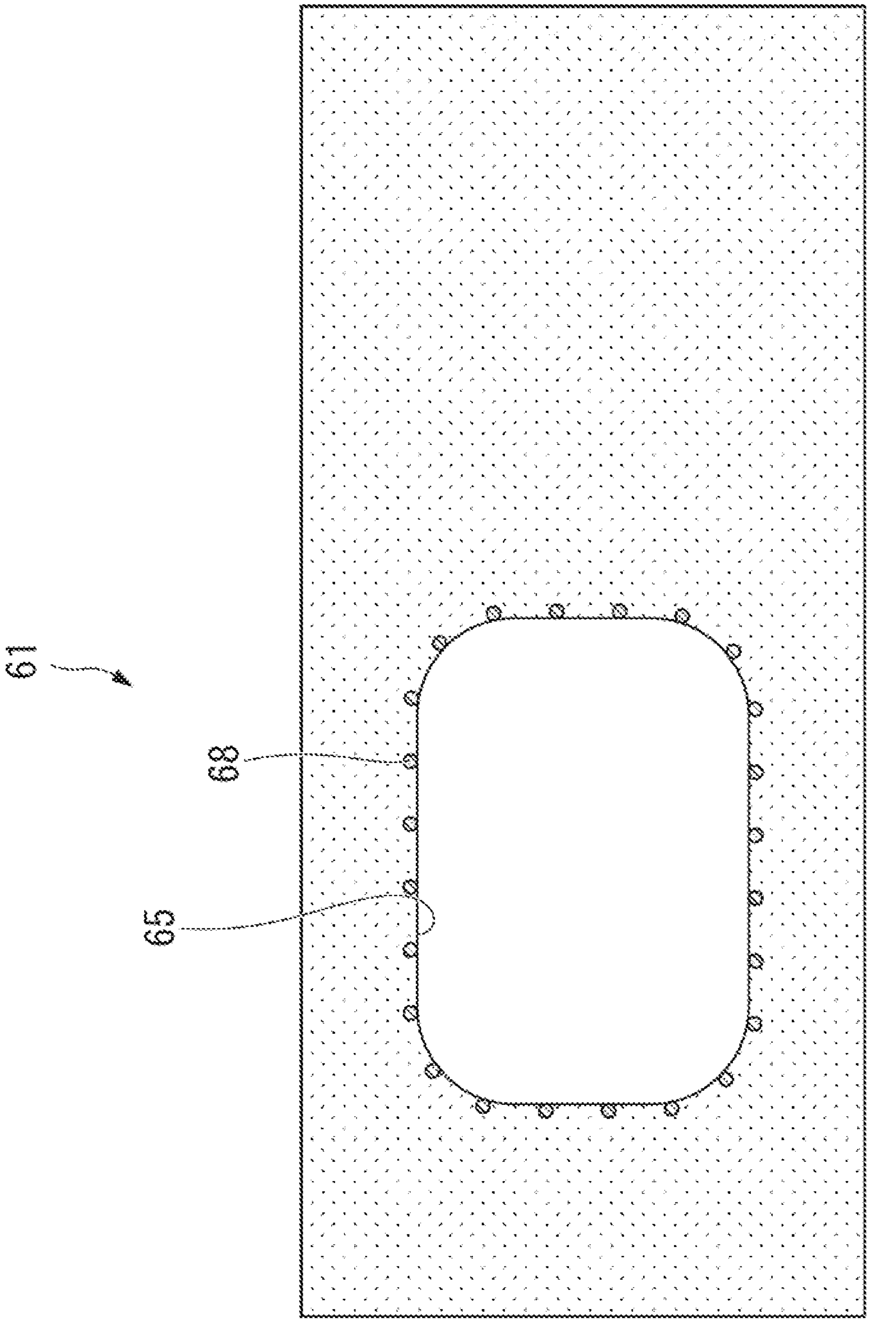
FIG. 16 is a plan view showing an inner layer pattern of a resin substrate according to the fourth embodiment of the present invention.
Figure 17:
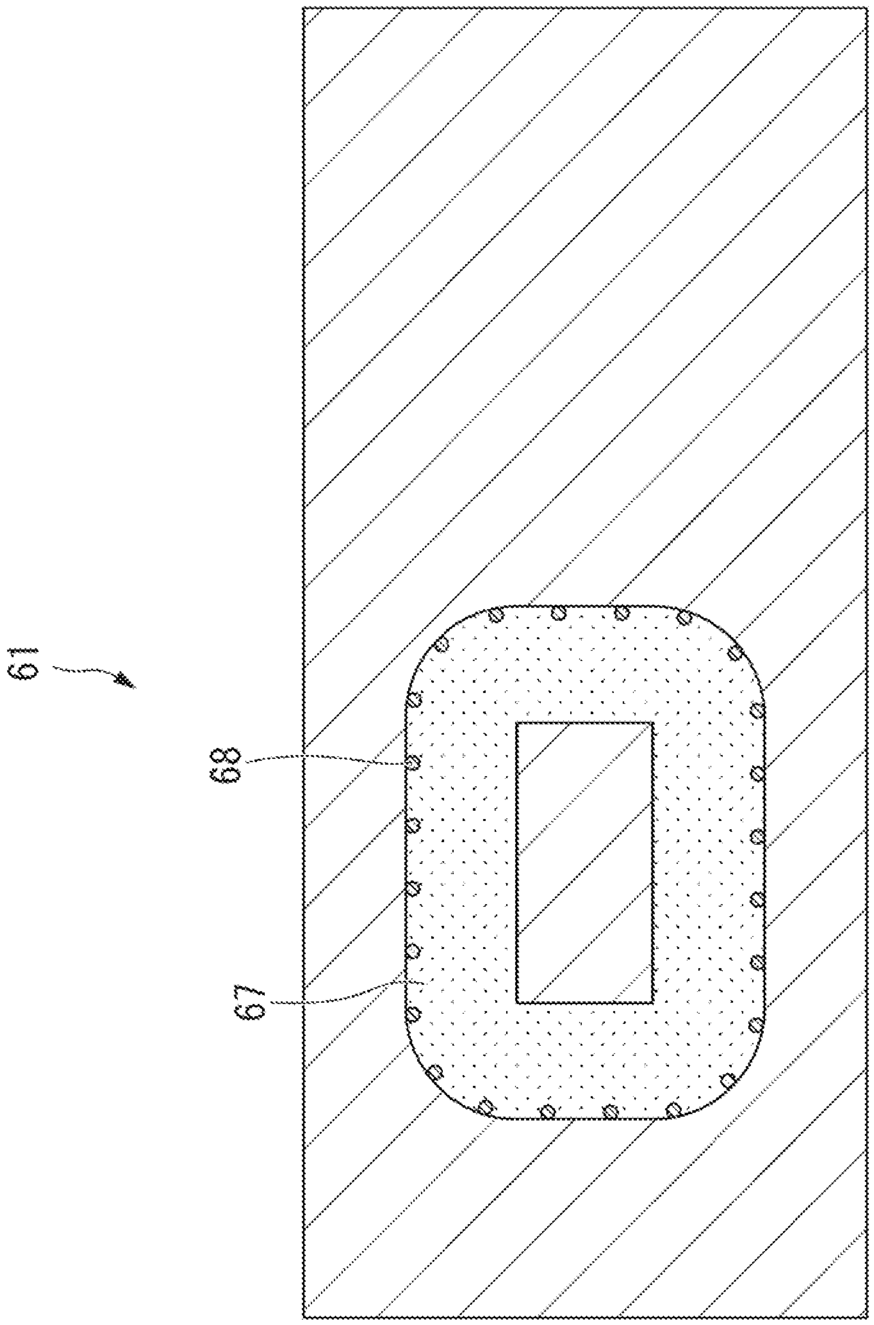
FIG. 17 is a plan view showing the inner layer pattern of the resin substrate according to the fourth embodiment of the present invention.
Figure 18:
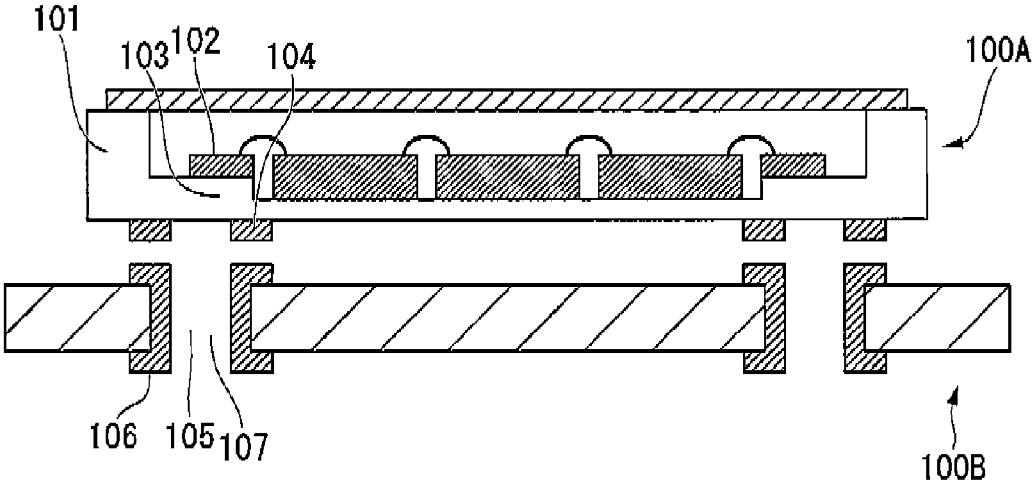
FIG. 18 Prior Art
FIG. 18 is a cross-sectional view showing the structure of a high-frequency module of the background art.

Next, a waveguide, a waveguide connection structure, and a waveguide connection method according to a fourth embodiment of the present invention will now be described with reference to FIGS. 15 through 17. FIG. 15 is a view for explaining configuration of the waveguide connection structure according to the fourth embodiment of the present invention. FIG. 16 is a plan view showing a copper film 65 and vias 68 of a resin substrate in the fourth embodiment of the present invention. FIG. 17 is a plan view showing an inner layer pattern 67 and vias 68 of a resin substrate in the fourth embodiment of the present invention.

As shown in FIG. 15, a resin substrate 61 has a second waveguide path 62, which is not shown in detail, formed therein, and a copper film 65 formed on a surface which is joined with a waveguide case 1. Vias 68 are formed at a position spaced apart from the second waveguide path 62 by the quarter of the wavelength λ. Each via 68 has the structure of a blind via that provides an electrical connection between layers of the resin substrate 11. The vias 68 are connected to the copper film 65, a part of which is not present from the second waveguide path 62 to a position of the quarter of the wavelength λ as an electric field, and to an inner layer pattern 67 formed from the waveguide path to the position of the quarter of the wavelength λ as the electric field. Further, the vias 68 are disposed in plural at such intervals that they are regarded as being electrically continuous.

Furthermore, in the present embodiment, a second stub 69 is formed in the resin substrate 61. Further, the second stub 69 is filled with a dielectric of the resin substrate 51. When an electric field of the second stub 69 is set to the quarter of the wavelength λ, the second stub 69 has an actual length shorter than that of the second stub 5 of the first embodiment which is filled with air.

In this case, the second stub 69 realizes the quarter of the wavelength λ with a dimension shorter than that of the second stub 5 of FIG. 6. Accordingly, it is necessary for a position of the stub 3 formed in the waveguide case to be fitted to the length of the second stub 5. That is, an end face of each via 68 on the side of the second waveguide path 62 and an end face of the stub 3 which is distant from the waveguide path are configured to have the same distance from the first waveguide path 2. Thereby, as in the first embodiment, the stub 3 is enclosed by the frame part, thereby forming a choke trench generating the half of the wavelength λ as the electric field.

In the present embodiment, when the waveguide case 1 and the resin substrate 61 come into contact with each other, the second stub 69 having a length a quarter of the wavelength λ is defined by the inner layer pattern 67, the vias 68, and the waveguide case 1. Further, the second stub 69 and the stub 3 constitute a choke trench 70. Even with this configuration, as in the first embodiment, it is possible to connect the first waveguide path 2 and the second waveguide path 62 in an electrically short-circuited state.

Further, in the present embodiment, the second stub 69 is filled with a dielectric. Accordingly, in comparison with other embodiments, the second stub 69 can be made small.

According to the waveguide and the waveguide connection structure of each embodiment mentioned above, when the waveguide having a waveguide path structure is joined with a connection counterpart, it is possible to suppress an increase in the insertion loss even when the junction of the waveguide and the connection counterpart becomes incomplete due to the screwing failure of the waveguide and the connection counterpart or the bending of the connection counterpart.

Furthermore, even when the junction of the waveguide and the connection counterpart becomes incomplete, it is possible to suppress an increase in the insertion loss. Accordingly, it is unnecessary to use the solder, or the like, which has been used in the related art, in order to realize reliable junction. As a result, it is possible to provide the waveguide and the waveguide connection structure which are capable of reducing material or assembly costs.

The embodiments of the present invention have been described in detail with reference to the drawings. However, specific configurations are not limited to the embodiments and may include any design in the scope without departing from the subject matter of the present invention.

For example, the embodiments of the present invention are configured so that the waveguide case 1 is plated with gold using copper as a base, but they are not limited to this configuration. For example, the base may be formed of another metal or another metal alloy without being limited to copper, and may include a casting free from cutting or anything made by other machining.

Furthermore, in the waveguide case 1, it is unnecessary to plate the base with gold, and thus another method may be employed. Further, the waveguide case may use an insulator on which metal is coated. Even in this case, it is possible to accomplish the effects of the aforementioned embodiments.

Further, the cross-sectional shape of the waveguide path of the embodiments of the present invention may be a circular shape in addition to the rectangular shape shown in FIG. 1. Further, the dimensions of the waveguide path are defined in, for instance, Japanese Industrial Standards (JIS), and thus a detailed description thereof will be omitted here.

Further, the stub 3 of the embodiments of the present invention is configured to be plated with gold like the waveguide case 1, but it is not limited to this configuration. It is possible to properly configure the stub 3 so as to have electrical conductivity. Particularly, when the waveguide case is made up of an electrically conductive base, it is possible to reduce additional costs for forming the stub 3 because an additional process of imparting the electrical conductivity other than grooving for the stub 3 can be omitted.

Further, in the embodiments of the present invention, the stub 3 is configured to be filled therein with air, but it is not limited to this configuration. For example, the stub 3 may be filled with a dielectric. In the case where the dielectric is filled, the stub is formed at such a depth that an electric field calculated from a dielectric constant of the filled dielectric becomes a quarter of the wavelength λ. Even in this case, it is possible to accomplish the effects of the aforementioned embodiments.

Further, in the embodiments of the present invention, the resin substrate 11 is shown as a connection target of the waveguide case 1. However, the connection target is not limited to the resin substrate, and thus may be a proper connection counterpart having a waveguide structure. Even in this case, it is possible to accomplish the effects of the aforementioned embodiments.

Further, in the embodiments of the present invention, the stub 3 and the second stub 5, both of which have a length a quarter of the wavelength λ, are combined to form a choke trench having a length half of the wavelength λ, but they are not limited to this configuration. For example, a proper combination in which the sum of the lengths of the stub 3 and the second stub 5 becomes a length half of the wavelength λ may be employed.

Furthermore, in the embodiments of the present invention, the stub 3 is formed in the axial direction of the first waveguide path, whereas the second stub 5 is formed in the radial direction of the first waveguide path. However, the stub and the second stub are not limited to this configuration. For example, the stub 3 and the second stub 5 may not be orthogonal to each other, and may be combined to realize a stub of the half of the wavelength λ although they are configured to have a plurality of bent parts. Even in this case, it is possible to accomplish the effects of the aforementioned embodiments.

Further, in the embodiments of the present invention, the metal wall 14 is formed by plating copper on the resin substrate. This is because, in a typical multilayer resin substrate, the copper plating is generally performed to form its interconnections, and the interconnections can be easily formed using this process. Although there are methods other than the copper plating, for example, the metal wall may be formed by attaching a conductor other than copper, the metal wall may be formed by a method of adhering an insulator and then coating a surface of the insulator.

Further, in the first embodiment of the present invention, the metal wall is configured to have a height of 50 microns, but it is not limited to this height. Thus, the metal wall may have any height. For example, the metal wall may have a proper height such that the second stub 5 is formed in the gap between the resin substrate 11 and the waveguide case 1.

Further, in the fourth embodiment of the present invention, the inner layer pattern 67 and vias 68 formed in the resin substrate 61 are configured to be formed of copper that is widely used for multilayer resin substrates, but they are not limited to this configuration. The inner layer pattern 67 and the vias 68 may be formed of another metal material. Even in this case, it is possible to accomplish the effects of the aforementioned other embodiments.

INDUSTRIAL APPLICABILITY

Applications of the present invention may include devices that use a multilayer substrate, which is required to realize smallness, thinness, and low cost, for a millimeter wave band, such as digital signal transmission modules that transmit a high-definition television signal to a thin television such as a wall-mounted television from a tuner or a recorder using the millimeter wave band, automobile radar modules that monitor surroundings such as the front of an automobile using the millimeter wave band, or the like.

REFERENCE SYMBOLS

1, 21, 41: waveguide case
2, 22, 42: first waveguide path
3, 43: stub
5, 69: second stub
11, 31, 51, 61: resin substrate (connection counterpart)
12, 32, 52, 62: second waveguide path
14: metal wall (frame part)
15: copper film
46: fitting trench
55: copper film
56: metal bump (frame part)
65: copper film
67: inner layer pattern (inner layer interconnection)
68: via (frame part)
R: electromagnetic wave

The invention claimed is:

1. A waveguide connection structure comprising:

a waveguide having a first tubular waveguide path that transmits electromagnetic waves having a predetermined wavelength, and a stub that is formed such that a depth thereof becomes a quarter of the predetermined wavelength, an open end of the stub making internal contact with a contour line, and the contour line being spaced apart from an inner wall part of one end of the first tubular waveguide path in a radially outward direction by only a quarter of the predetermined wavelength; and a connection counterpart having a second waveguide path that forms a surface having the same shape and size as a radial cross section of the first waveguide path and transmits the predetermined wavelength of the electromagnetic waves, and an electrically conductive frame part that can make external contact with an outer circumference of the open end of the stub on an outer side of the second waveguide path and is electrically connected to the second waveguide path, wherein the electrically conductive frame part comprises:

vias that make external contact with a position spaced apart from a wall of the second waveguide path in an outward direction by only a quarter of the predetermined wavelength, that are disposed so as to be electrically continuous, and that extend into the connection counterpart; and at least one of inner layer patterns and a planar inner layer pattern that is connected to the vias so as to be electrically equivalent to a metal plane from the wall of the second waveguide path to the vias.

2. A waveguide connection structure comprising:

a waveguide having a first tubular waveguide path that transmits electromagnetic waves having a predetermined wavelength, and a first stub that is formed such that a depth thereof becomes a quarter of the predetermined wavelength, an open end of the first stub making internal contact with a contour line, and the contour line being spaced apart from an inner wall part of one end of the first tubular waveguide path in a radially outward direction by only a quarter of the predetermined wavelength; and a connection counterpart having a second waveguide path that forms a surface having the same shape and size as a radial cross section of the first waveguide path and transmits the predetermined wavelength of the electromagnetic waves, and an electrically conductive frame part that can make external contact with an outer circumference of the open end of the first stub on an outer side of the second waveguide path and is electrically connected to the second waveguide path, wherein the electrically conductive frame part is made up of a plurality of metal bumps disposed so as to be electrically continuous.

3. The waveguide connection structure according to claim 2, wherein the waveguide and the electrically conductive frame part are connected to define a second stub, and the second stub and the first stub are integrated to form a choke trench having a length half of the predetermined wavelength.

4. The waveguide connection structure according to claim 2, wherein the electrically conductive frame part forms a closed annular shape made of metal.

5. The waveguide connection structure according to claim 2, wherein the waveguide comprises a fitting trench fitted to the electrically conductive frame part.

6. The waveguide connection structure according to claim 2, wherein the connection counterpart comprises a resin substrate having a resin layer and a metal layer.

7. A waveguide connection method comprising:

forming a stub which makes internal contact with a contour line spaced apart from an inner wall part of one end of a waveguide, which has a first waveguide path transmitting electromagnetic waves having a predetermined wavelength, in a radially outward direction by only a quarter of the predetermined wavelength and a depth of which becomes a quarter of the predetermined wavelength;

in a connection counterpart having a second waveguide path transmitting the predetermined wavelength of the electromagnetic waves, forming an electrically conductive frame part which is electrically connected to the first waveguide path so as to make external contact with a position spaced apart from a wall of the second waveguide path in an outward direction by only a quarter of the predetermined wavelength; and fixing the waveguide and the connection counterpart under pressure after an open end of the stub is fitted to a position making internal contact with the frame part, and connecting the waveguide and the second waveguide path, wherein the electrically conductive frame part comprises:

vias that make external contact with a position spaced apart from a wall of the second waveguide path in an outward direction by only a quarter of the predetermined wavelength, that are disposed so as to be electrically continuous, and that extend into the connection counterpart; and at least one of inner layer patterns and a planar inner layer pattern that is connected to the vias so as to be electrically equivalent to a metal plane from the wall of the second waveguide path to the vias.

* * * * *